Feb. 6, 1951    J. J. NELSON    2,540,591
TOW HITCH
Filed July 20, 1948
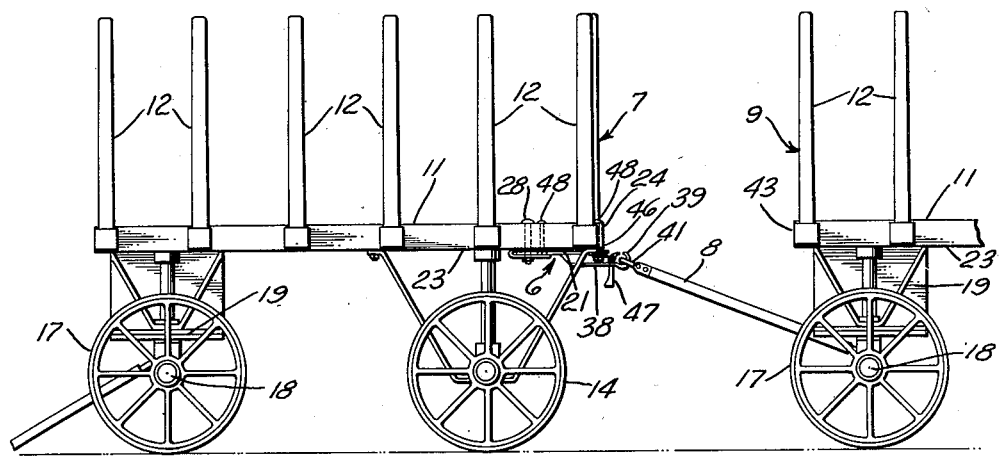
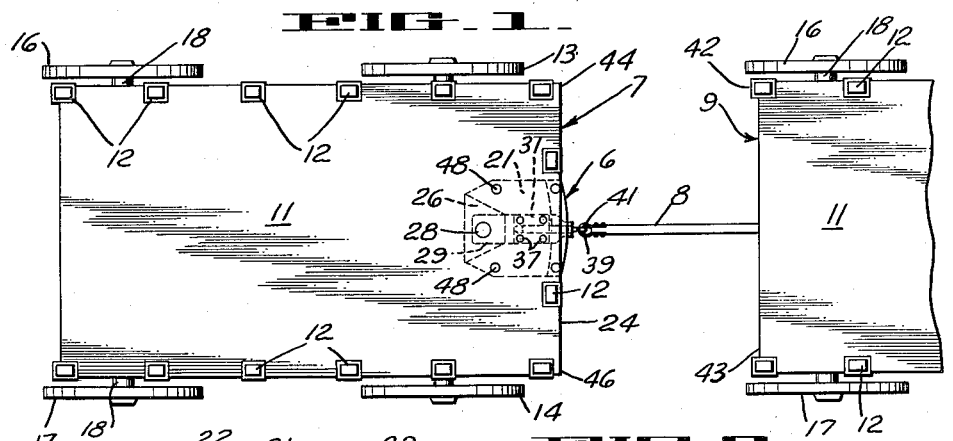
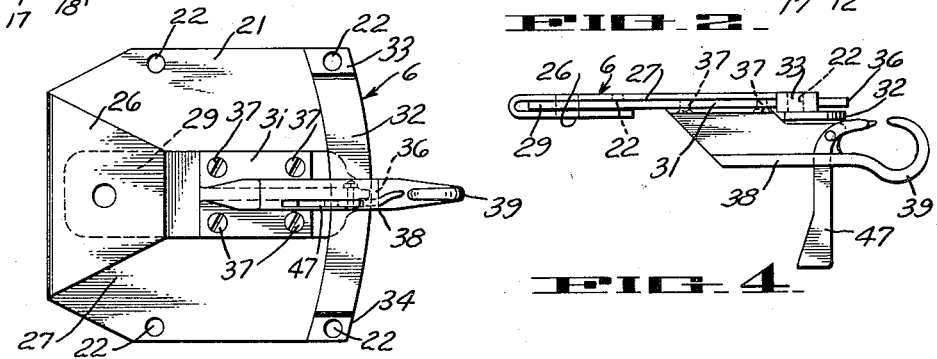
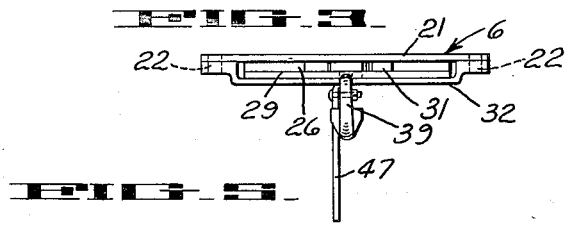
INVENTOR.
JOHN J. NELSON
BY Patented Feb. 6, 1951

2,540,591

UNITED STATES PATENT OFFICE 2,540,591

TOW HITCH

John J. Nelson, Alameda, Calif.

Application July 20, 1948, Serial No. 39,601

1 Claim. (Cl. 280—33.15)

The invention relates to hitch devices customarily mounted at the rear of a tow vehicle for coupling thereto a draft tongue of a trailing vehicle to be towed, and relates more particularly to the type of hitch or draw bar used on so-called "Mary Ann" wagons employed in railroad stations and the like for hauling baggage and other cargo.

An object of the present invention is to provide a tow hitch of the character described particularly designed for attachment to the rear of a Mary Ann wagon for connection thereto of the draft tongue of a second Mary Ann wagon to be towed and which will afford a limited free swinging movement of the hitch, enabling the coupled wagons to be moved around a sharp turn while positively preventing the adjacent corners of the wagons and the baggage carried thereby from colliding, thereby avoiding and preventing a common cause of damaging and breaking of the wagons and baggage.

Another object of the invention is to provide a tow hitch, of the character above, which is constructed of a minimum number of sturdily formed parts capable of withstanding the abusive action to which the hitch is subjected throughout a substantially unlimited useful life and wherein the hitch is designed for simple and ready attachment to the load platform of a wagon and formed for safe, foolproof, and quick and easy attachment and detachment to the draft tongue of a wagon to be towed.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claim.

Referring to said drawing:

Figure 1 is a side elevation of a tow hitch constructed in accordance with the present invention and shown operatively mounted on the rear of a Mary Ann wagon in coupled relation to the draft tongue of a second wagon shown in part.

Figure 2 is a plan view of the wagons and tow hitch illustrated in Figure 1.

Figure 3 is a bottom view of the tow hitch shown in an enlarged scale.

Figure 4 is a side elevation of the hitch illustrated in Figure 3.

Figure 5 is a front elevation of the hitch illustrated in Figures 3 and 4.

The tow hitch of the present invention, denoted generally in the accompanying drawing by numeral 6, is, as hereinabove noted, particularly designed for use with a Mary Ann wagon 7, illustrated in Figures 1 and 2 of the drawing, for detachably coupling thereto the draft tongue 8 of a second Mary Ann wagon 9 adapted to be towed by the wagon 7. These wagons are commonly employed in and about railroad stations, and the like, for hauling baggage and other cargo and include a load platform 11 having a plurality of side stakes 12 and supported for movement upon rear wheels 13 and 14 and front wheels 16 and 17. The front axle 18 is supported for pivotal movement about a vertical axis centrally of its length by a bearing structure 19 thereby permitting an arcuate movement of the front axle for turning of the wagon. The draft tongue 8 may be pivotally secured by a horizontal axis in any suitable manner to the front axle 18.

The tow hitch 6, as will be best seen from Figures 3 to 5, comprises a mounting plate 21 provided with openings 22 for bolting or otherwise securing to the underside 23 of the load platform 11 at the rear side 24 thereof. One end portion 26 of the plate is folded to underlie an adjacent body portion 27 of the plate in spaced substantially parallel relation. Mounted between the opposed sides 26 and 27 of the plate and pivotally secured thereto, as by means of a bolt 28, is one end 29 of an elongated lever part 31 thus mounted for swinging movement relative to the plate 21 in a plane substantially parallel thereto. A strap 32 secured at its opposite ends 33 and 34 to the plate 21 is formed with a raised central portion generally straddling the free end 36 of the lever 31 so as to limit the swinging movement of the lever to limited distances on opposite sides of a line extending rearwardly from the pivot 28. Secured to the lever 31, intermediate its ends 29 and 36, as by means of bolts or rivets 37 and depending therefrom and extending rearwardly thereof, is a generally elongated member 38 formed with a hook 39 at its free end for engagement with an eye 41 mounted at the forward end of the draft tongue 8. In this manner, the hook member 38 and the forward end of the draft tongue 8 coupled thereto are free to swing from side to side of the longitudinal line of movement of the vehicle within the limits imposed by strap 32 on free end 36 of lever 31. Preferably, the size and length of the several parts and the mounting of the hitch to the load platform are such as to extend the hook end 39 of the hitch somewhat rearwardly of the rear end 24 of the platform throughout the full arc of movement of the hook.

As will be clear from the foregoing, and as an important feature of the present invention, as hereinabove noted, the swivel mounting of the draft hook affords an articulated connection between the coupled wagons 7 and 9 of such a character as to permit the connected wagons to be drawn around a relatively sharp corner while, at all times, maintaining a safe clearance and spacing of the opposed front corners 42 and 43 of the rear wagon 9 and the rear corners 44 and 46 of the front wagon 7. With tow hitches and constructions heretofore used, the common collision of these opposed corners of the wagon has been a constant source of danger and damage to the wagons and to the baggage carried thereon.

The safety catch 47 is desirably incorporated in the hook end 39 for preventing accidental uncoupling of the hook and the draft tongue 8. This structure forms the subject matter of another application which will be copending with this application.

Assembly of the several parts and attachment to the load platform of the wagon is here effected in a simple and direct manner. Mounting bolts 48 engageable through the plate openings 22, hereinabove described, preferably extend through the full depth of the mounting platform 11, as illustrated in Figure 1, and a pair of such bolts, at the rear of the plate may be used to additionally secure in place the opposite ends 33 and 34 of the strap 32. To afford additional support for the plate, the pivot bolt 28 for the lever 31 may likewise extend through the full depth of the platform 11, as illustrated in Figure 1. In this manner, it will be seen that the device is ruggedly assembled and attached to the wagon and the design of the several parts, as above described, permits the use of relatively heavy sturdily formed parts which will withstand the strains and strenuous use to which the device is subjected.

I claim:

In combination with a vehicle having a load platform, a mounting plate secured to said platform and having an end portion folded into substantially parallel relation with the body of said plate, a lever member having one end mounted between said end and body and pivoted about an axis substantially perpendicular to the planes thereof for swinging of said member in a plane substantially parallel to said plate and said platform, means depending from said lever member, a hook member secured to said means and projecting longitudinally therefrom and beyond the other end of said plate, a strap secured to said other end of the plate and overlying a portion of said hook, and an extension of said lever member lying between said plate and said strap whereby the pivotal movement of said lever is limited about said axis.

JOHN J. NELSON.

REFERENCES CITED

The following references are of record in the file of this patent:

UNITED STATES PATENTS

| Number | Name | Date |
|---|---|---|
| 1,398,416 | Carner | Nov. 29, 1921 |
| 1,604,697 | Kegreese | Oct. 26, 1926 |
| 1,829,959 | Lindaas | Nov. 3, 1931 |
| 1,955,876 | Ferguson | Apr. 24, 1934 |